United States Patent [19]

Kojima et al.

[11] 4,314,043
[45] Feb. 2, 1982

[54] FLUORINE-CONTAINING ELASTOMERS

[75] Inventors: Gen Kojima, Machida; Masayuki Tamura; Michio Hisasue, both of Yokohama, all of Japan

[73] Assignee: Asahi Glass Company, Ltd., Tokyo, Japan

[21] Appl. No.: 174,438

[22] Filed: Aug. 1, 1980

[30] Foreign Application Priority Data

Aug. 17, 1979 [JP] Japan ............................ 54-104054

[51] Int. Cl.$^3$ .................. C08G 81/02; C08L 53/00
[52] U.S. Cl. ............................ 525/102; 525/103; 525/104
[58] Field of Search ............... 525/102, 103, 104, 479

[56] References Cited

U.S. PATENT DOCUMENTS

| | | | |
|---|---|---|---|
| 2,958,707 | 11/1960 | Warrick | 525/479 |
| 3,415,900 | 12/1968 | Robb | 525/104 |
| 3,436,252 | 4/1969 | Neuroth | 525/479 |
| 3,471,588 | 10/1969 | Kanner et al. | 525/104 |

FOREIGN PATENT DOCUMENTS 46-9355  3/1971  Japan ............................ 525/102

Primary Examiner—Wilbert J. Briggs, Sr.
Attorney, Agent, or Firm—Oblon, Fisher, Spivak, McClelland & Maier

[57] ABSTRACT

Fluorine-containing elastomers comprise the grafted copolymer havig rubber-like elasticity and having chemical linkages at the reactive sites of fluorine-containing polymeric segments and organopolysiloxane segments.

14 Claims, No Drawings they are of rubber-like elasticity and the molecular weight is preferably in the range from 500 to 500,000.

FLUORINE-CONTAINING ELASTOMERS

BACKGROUND OF THE INVENTION

1. Field of the Invention:

The present invention relates to novel fluorine-containing elastomers and more particularly to fluorine-containing elastomers best characterized by excellent compatibility with fillers, high thermal resistance and good oil resistance, whose composition is the chemically grafted copolymer consisting of fluorine-containing polymeric segments and organopolysiloxane segments.

2. Description of Prior Art:

Rubber-like materials having the three distinct characteristic properties of high thermal resistance, good oil resistance, and satisfactory low temperature properties are of great demand in market. The prior art of fluorine-containing elastomers, such copolymers as, for example, vinylidene fluoride-hexafluoropropylene, tetrafluoroethylene-propylene and terafluoroethylene-perfluoroalkylperfluorovinyl ether have excellent thermal resistance and oil resistance, however, do not have satisfactory low temperature properties. On the other hand, silicone rubbers having such main chain as, for example, dimethylsiloxane and methylphenylsiloxane exhibit excellent thermal resistance, together with satisfactory low temperature properties, but oil resistance of the said rubbers is unfortunately not up to the required standard.

To overcome this aspect of difficulty, fluorosilicone rubbers consisting of methyl trifluoropropylsiloxane as main chain and that fluorophosphazane rubbers have been developed, but they are still too expensive enough to fill the market needs.

As is well known for those skilled in this art, blending of silicone rubbers having excellent heat resistance and satisfactory low temperature properties and fluorine-containing rubber has been extensively studied in order to incorporate both advantageous properties and to avoid the disadvantages each component thereof. This approach, however, has not been successful because of the lack of compatibility of the rubber toward each other, the difference in machanism and rate of curing, and the difference in viscosities of each polymeric component, so that the said blended compound is still not in a position of practical use.

Fluorocarbon rubbers are generally not highly compatible with inorganic fillers, such as for example, carbon black, clay and talc. When forced to mix, rubber-like elasticity is surely lost. Therefore, although fluorocarbon rubbers have excellent thermal resistance and oil resistance, it can not be used for oil-sealing nor other similar purposes. Moreover, fluorocarbon rubbers exhibit relatively high viscosity owing to the inflexibility of the main chain. In addition, nonstickiness and lubricance of the fabricated articles are not always sufficient.

SUMMARY OF THE INVENTION

According to the present invention, the above-mentioned difficulties are remarkably overcome in the present grafted copolymers comprising fluorine-containing polymeric segments and organopolysiloxane segments, which also exhibit various other excellent properties hereinafter described.

This type of grafted copolymers can be easily obtained by forming the chemical linkage between the said two types of segments having reactive sites therein, for example, the grafted copolymers can be prepared by the chemical reaction between the epoxide group incorporated in fluorine-containing polymeric segments comprising glycidyl vinyl ether and the amino group in organopolysiloxane having amino functional groups therein.

It is an object of the present invention to provide novel fluorine-containing elastomers having rubber-like elasticity based on the aforementioned findings, which can be prepared by the chemical linkage between fluorine-containing polymeric segments and organopolysiloxane segments through the reactive sites thereof.

DETAILED DESCRIPTION OF THE PREFERRED EMBODIMENT

The present fluorine-containing elastomers exhibit various advantageous properties, which can generally be found either in fluororubbers or silicone rubbers, for example, the excellent compatibility with fillers in comparison with ordinary fluororubber. More specifically, the present fluorine-containing elastomers can be effectively mixed with 80 parts by weight of carbon black based on the said elastomer with recording the hardness ranging from 50 to 80, whereas ordinary fluororubber comprising tetrafluoroethylene-propylene copolymer or vinylidene fluoride-hexafluoropropylene copolymer, when mixed with 35–50 parts by weight of carbon black per 100 parts by weight of the said rubber exhibit the hardness well over 80.

Oil resistance of the present elastomers is found more excellent than that of silicone rubber or that of mere blended compounds. Owing to the high compatibility with fillers, the actual oil resistance of the present elastomers is comparable to that of conventional fluororubbers.

The present elastomers also inherit thermal resistance from fluororubber and silicone rubbers, and the said resistance is better than that of ordinary fluorosilicone rubbers.

The low temperature properties of the present fluorine-containing elastomers can be further improved by adjusting the degree of polymerization, the ratio of fluorine-containing polymeric segments and organopolysiloxane segments to achieve the level of silicone rubbers. This aspect has long been hardly solved by merely blending the two components, and thus can be regarded as a remarkable advantage incorporated into the present fluorine-containing elastomers.

According to the present invention, fluorine-containing polymeric segments consist of at least one kind of polymerized olefinic parts, preferably, elastic copolymer of two or more different monomeric units having reactive sites A. More specifically, the aforementioned segment can be selected from tetrafluoroethylene-propylene copolymer, tetrafluoroethylene-perfluoroalkylperfluorovinyl ether copolymer, vinylidene fluoride hexa . . . fluoropropylene copolymer, and vinylidene fluoride-pentafluoropropylene copolymer, furthermore, vinylidene fluoride tri . . . flurochloroethylene copolymer, tetrafluoroethylene-ethylene-isobutylene copolymer, ethylene-hexafluoropropylene copolymer, tetrafluoroethylene-buthene-1 copolymer, tetrafluoroethylene-ethylvinyl ether copolymer, tetrafluoroethylene-CF$_3$NO copolymer, and vinylidene fluoride-perfluoroalkylperfluorovinyl ether copolymer.

The ratio of each monomeric units can be selected in a wide range as far as the resulting copolymers are elastic, such as for example, the copolymer may contain 40–70 mol.% of tetrafluorethylene and 60–30 mol.% of propylene; the copolymer of 50–90 mol.% of vinylidene fluoride, 10–50 mol.% of hexafluoropropylene and 0–30 mol.% of tetrafluoroethylene; the copolymer of 30–90 mol.% of tetrafluoroethylene and 70–10 mol.% perfluoroalkylperfluorovinyl ether; the copolymer of 50–90 mol.% vinylidene fluoride and 10–50 mol.% pentafluoropropylene and others.

It is also possible that the said fluorine-containing polymeric segments contain the major chain with reactive sites, together with other monomeric units in appropriate amounts.

The present organopolysiloxane segments can be selected from the well known or available organopolysiloxanes but of course not limited thereto. A wide variety of organopolysiloxanes, such as homopolymers or copolymers comprising dimethylsiloxane or methylphenyl siloxane or trifluoropropyl siloxane having reactive sites B therein can be selected.

According to the present invention, the aforementioned reactive sites A and B undergo chemical reaction to form the grafting sites to link chemically fluorine-containing polymeric segments and organopolysiloxane segments, yielding the graft copolymers. Such reactive sites can be illustrated by the following examples;

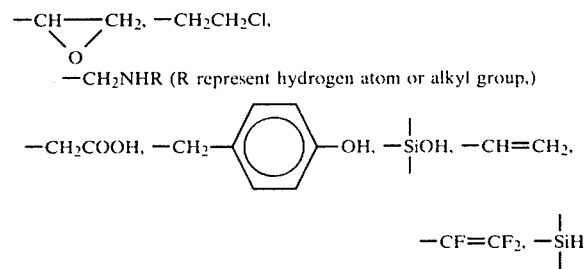

These reactive sites undergo chemical reactions according to the following scheme:

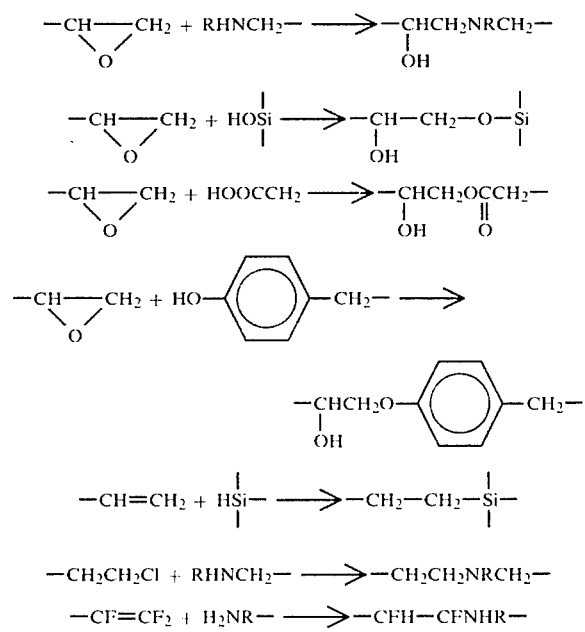

The combination of epoxide group in the fluorine-containing polymeric segments and the amino group or carboxylic group in organopolysiloxane segments are desirable, and of course, alternative combination of the amino or carboxylic group incorporated in fluorine-containing polymeric segments and the epoxide group in organopolysiloxane segments are also possible. The reactive groups can be best selected by careful consideration of the reactivity of the sites to be grafted, preparative easiness, the stability of the formed grafted linkages and so forth.

The polymeric segments having reactive sites may be prepared by variety of means, but can generally be prepared by copolymerization of the aforementioned main chain monomer unit and the monomer unit of reactive site, that is fluorine-containing polymeric segments can be obtained by copolymerization of fluorine-containing olefin and the monomer having reactive site A, and the organopolysiloxane segments having reactive site B can be prepared by the copolymerization of organosiloxane having reactive site B and the main chain component monomer, such as, for example, dimethylsiloxane. The reactive site A can be selected from the group comprising such as, glycidyl vinyl ether, acrylic acid, methacrylic acid, 2-chloroethylvinyl ether, glycidyl acrylate. The reactive monomer having site B may be selected from the group of organosiloxanes, such as illustrated below:

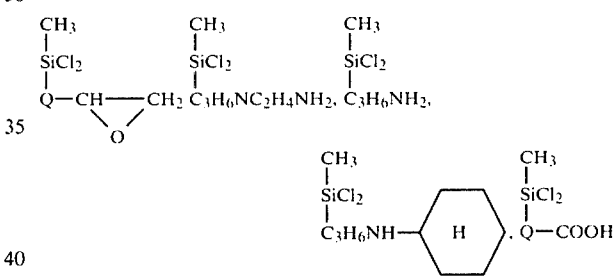

The present fluorine-containing elastomers are the grafted copolymers having rubber-like elasticity, comprising fluorine-containing polymeric segments and organopolysioxane segments which are chemically linked through the reactive sites A and B.

The average degree of polymerization of the said segments may vary within a wide range, but generally 50–10,000 for fluorine-containing polymeric segments, and that of organopoly-siloxane segments being 50–50,000.

Fluorine-containing polymeric segments can be chosen as main chain, while organopolysiloxane segments are selected for branch, or, of course, vise versa, or even in a mixed mode thereof. For example, the combination of fluorine-containing polymeric segments of average degree of polymerization can be more than 1,000 and the organopolysiloxane segments are less than 3,000, or the average degree of polymerization of fluorine-containing polymeric segments is less than 1,000, while that of organopolysioxane segments being more than 3,000. Preferably, the average degree of polymerization of the fluorine-containing polymeric segments is within the range of 100–5,000, and that of organopolysiloxane segments lying between 100–30,000.

The ratio between the number of branches over one main chain in the grafted copolymer may vary within the range of 1/50,000–1/10, preferably, 1/30,000–1/100.

According to the present invention, the branch segments can be prepared during the course of graft copolymerization, for example, organopolysiloxane segments comprising vinyl group as reactive site are first prepared, and then fluorine-containing monomer can be grafted to form fluorine-containing polymeric segments. However, it is more easily prepared when the said main chain polymeric segments and branch polymeric segments are separately prepared, and then chemically linked through the reactive sites A and B. because the possible gel formation can easily be controlled.

The polymeric segments having reactive sites can be selected from the aforementioned group, and the mol. ratio of reactive sites over one main chain segment may vary within a wide range, generally, within 0.01–20 mol.%, preferably 0.1–5 mol.%. If the concentration of reactive site is too low, the graft copolymerization cannot proceed smoothly, and if it is too high, cross-linking reaction undergoes preferentially to form three dimentional network, resulting in an undesired product which fails to give rubber-like elastomer of excellent properties. Therefore, the said ratio must be selected by careful consideration of the average degree of polymerization, reactive site properties and monomeric unit constituting the polymeric segments, and the mol. ratio between fluorine-containing polymeric segments and organopolysiloxane segments, all of which depend on the required properties and/or purpose of the grafted copolymer to be obtained.

In the present invention, the ratio of the present fluorine-containing polymeric segments and organopolysiloxane segments in the said grafted copolymers can also vary within a wide range, depending on the average degrees of polymerization of the said segments, the required properties and purpose of the grafted copolymers, and further which part of the said segments is selected for the main chain of the copolymer to be prepared. Generally, the ratio can vary within 1–2,000 parts by weight of organopolysiloxane segments, preferably, 5–1,000 parts by weight, for 100 parts by weight of the said fluorine-containing polymeric segments. When the amount of organopolysiloxane segment is too low, good low temperature properties and high compatibility with fillers may be lost, and that when excessive amount of the said organopolysiloxane segments is added, the good oil resistance will not be attained.

The graft copolymerization between the aforementioned segments through reactive sites is most preferred method to obtain the said fluorine-containing elastomers in order to practice effectively the present invention. It is also preferred to promote the graft copolymerization in organic solvent wherein the said two segments are ensured to be mixed homogeneously, that is, after both segments are completely dissolved in good solvent, the graft copolymerization must be initiated. Such organic solvent can be selected for the group as listed below; trifluorotrichloroethane, trichloroethylene, ethyl acetate, acetone, methyl ethyl ketone, tetrahydrofurane, dioxane and other fluorochlorohydrocarbons, esters, ketones, or cyclic ethers.

The reaction temperature can also vary depending on the combination of the reactive functional sites incorporated in the said polymeric segments. In case of the combination of epoxide and amino group, the room temperature may be employed, or the refluxing temperature of the solvent used, or even it is possible to proceed the reaction as the solvent is being evaporated.

The reaction time may not be specified, and depending on the reaction temperature, it may be set between 10 minutes and several hours. After the reaction is completed under the condition of homogeneous solution, the unreacted portion of reactants can further be reacted by heating or drying during the course of solvent evaporation. It is also possible to remove the unreacted portion of the polymeric segments by appropriate solvent extraction, for example, carbon tetrachloride or n-hexane can be employed to extract the said siloxane segments.

The present fluorone-containing elastomers can be cured in various means to produce rubber stocks. In order to cure the said elastomers effectively, various kind of curing sites can be incorporated into the present fluorine-containing polymeric segments. Such curing sites can be incorporated into either fluorine-containing polymeric segments or organopolysiloxane segments, or even both segments by the same methods as specified for the incorporation of the aforementioned reactive sites. The curing sites can be copolymerized with the monomer having reactive site A or that of B. The curing sites may be or may not be the same chemical species as that of reactive sites; in case that the same functional group is employed for curing sites, any one of the reactive sites combination capable to form the graft linkage must be in excess amount, so that the unreactive sites can be used for further curing process.

Depending on the chemical species, the present fluorine-containing polymeric elastomers may be classified as peroxide-curable type, amine-curable type and so forth.

The curing sites for fluorine-containing polymeric segments can be selected from the group as illustrated below; glycidylvinyl ether, glycidylacrylate, chloroethyvinyl ether, acrylic acid, methacrylic acid, bromotrifluorethylene, $CF_2=CF-OCF_2CF=CF_2$, vinylidene fluoride, $CH_2=CHO-CF_2CF=CF_2$, hydroxyethylvinyl ether, and also for organopolysiloxane segment,

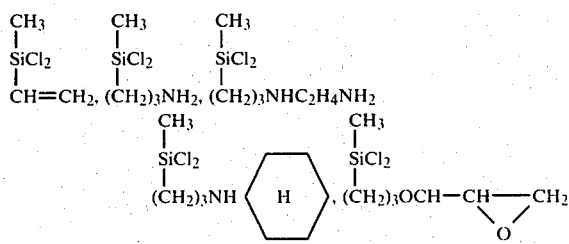

the ratio between the amount of curing sites and that of grafted copolymer is 0.1 to 5 mol.% based on grafted copolymer.

The present fluorine-containing elastomers can be obtained by any of the well known preparative prodedures; for example, fluorine-containing polymeric segments can be prepared through emulsion polymerization, suspension polymerization or bulk polymerization by employing batch method, semi-batch method or continuous method at polymerization temperature ranging from 0° to 150° C. preferably, 5° to 100° C., under 3 to 50 kg/cm² preferably under 5 to 50 kg/cm².

Initiators can be selected from the group comprising such as, for example, persulphate salt, hydrogen peroxides, inorganic peroxides and their redox systems (reducing agents may be selected from sulfite salts, bisulfite salts, reduced phosphates such as biphosphate salts, rongalite, Fe, Ag, Cu metal ions, amines and so forth), organic peroxides and their redox systems, organic fluoroperoxides and ionizable radiation. In order to produce the polymers of high degree of polymerization, emulsion method may be the best choice, whereas suspension or solution method is recommended to produce low degree of polymerization. In case of polymerization in water, various additives can also be added, for example, emulsifying agent may be added for emulsion polymerization, in particular, water soluble salts of polyfluorohaloaliphatic acids, soluble salts of perfluorohaloaliphatic acids, phosphate esters of polyluoroalcohols or sulfate esters and other emulsifiers of polyfluorinated or polyfluorinated chlorinated alkyl types, furthermore, water soluble salts of higher fatty alcohol sulphate esters of aromatic sulphonic acid salts can also be used, which can also be employed in the form of the mixture thereof.

The amount of such emulsifiers may be 0.0001 to 10 weight %, preferably, 0.001 to 5 weight %. Dispersion stabilizers, such as trifluorotrichloroethane, liquid halogenated hydrocarbons, liquid saturated hydrocabons can be added, and the pH adjusters, buffers, promoters may be such as sodium hydroxide, potassium hydroxide, ammonium hydroxide, sodium hydrogen phosphate. Furthermore, methanol, tert-butylalcohol, methyl acetate to facilitate copolymerization rate and such molecular weight controlling agents as water-soluble organic solvents as chloroform, tetrachloromethane, malonic acid esters can also be added therein. For the preparation of organosiloxane segments, the ring-opening polymerization of silanols or cyclic siloxanes prepared by hydrolysis of dichlorosilanes can be employed through the initiation by acidic or alkaline catalysts, that is, cyclic siloxanes are first prepared by hydrolysis of chlorsiloxanes, which in turn undergo anionic polymerization using alkaline catalyst such as hydroxides of lithium, potassium, sodium, and cesium or tetramethyl hydroxy-ammonium to form linear chain polymers at 100° to 200° C., and also by using acidic catalysts, such as sulfuric acid, nitric acid, phosphoric acid, active clay, ferric chloride, boric acid, trifluoroacetic acid at ordinary temperature or at elevated temperature.

The present fluorine-containing elastomers can be cured smoothly by various curing methods under various curing conditions. For example, any one or more chemical cross-linking agents can be selected from the organic peroxides comprising monoperoxy derivatives, such diacyl peroxide as dibenzoyl peroxide, such peroxy esters as dicumyl peroxide, di-t-butyl peroxide, t-butyl peroxyacetate, t-butylperoxy-iso-propylcarbonate, t-butylperoxy benzoate and such di-peroxy derivatives as 2, 5-dimethyl-2, 5-di-(t-butylperoxy)hexyne-3, 2, 5-dimethyl 2, 5-di-(t-butyl peroxy)-hexane, $\alpha'\alpha'$-bis-(t-butylperoxy)-p-di-isopropylbenzene, 2, 5-di-(benzoylperoxy)-hexane. Anyoene or the mixture thereof can be used for the above-mentioned radical curing.

The amount of chemical cross-linking agent to be used is 0.1 to 20 parts by weight, preferably, 1 to 10 parts by weight based on 100 parts by weight of fluorine-containing elastomer.

Cross-linking can also be initiated by ionizable radiation $\alpha$-ray, $\beta$-ray, $\gamma$-ray, neutron-ray, accelerator particle, X-ray, electron-ray, but generally $\gamma$-ray from $Co^{60}$, accelerator particles, electron beam can be used.

To cross-link the present fluorine-containing elastomers, irradiation dose rate of $10^2$ to $10^9$ roentgen/hour, especially, $10^3$ to $5 \times 10^7$ roentgen/hour and the total dose of $10^4$ to $10^9$ rad, most preferably, $10^6$ to $5 \times 10^7$ rad can be selected. Irradiation may be performed in open air, or in vacuum, or under the atmosphere of inert gas, such as argon, helium, nitrogen, water and so forth, and that irradiation temperature may not be necessarily limited, since cross-linking proceeds effectively even at ordinary temperature.

Therefore, it is possible to do the cross-linking at less than room temperature or more than 100° C.

Furthermore, in any of the methods employed, either inonizable irradiation or peroxide method, the well known cross-linking coagents can be added thereto by selecting from the group composing allyl derivatives, sulfur, organic amines, maleimide derivatives, methacrylate, divinyl derivatives, preferably, polyallyl derivatives, such as diallyl phthalate, triallyl phosphate, triaillyl cyanulate, triallyl isocyanulate, diallyl melamine, and oxime derivatives, such as p-benzoquinone dioxime, p,p'-dibenzoylbenzoquinone dioxime, but, especially, allyl derivative are preferred. The amount of cross-linking co-agent to be added may be 0.1 to 20 parts by weight, preferably, 0.2 to 10 parts by weight based on 100 parts by weight of the fluorine-containing elastomer.

When amines are used as cross-linking agent, they can be selected from polyalkylamines, such as, for example, hexylamine, hexamethylenediamine, tetraethylenepentamine, triethyleneteramine or the carbamic and cinnamilidic acid derivatives thereof, such aromatic polyamines the salts cinnamylidene acid derivatives salts, or piperadine, piperydine, pyridine, aniline, phenanthroline, furthermore, Schiff's bases or thiocarbamate, or such nucleophilic reagents as hydroquinoene, bishpenol-A, catecole and their alkaline metal salts, ammonium salts, together with linear polyethers or cyclic polyethers such as polyethylene glycohol, polypropylene glycohol as catalyst. In case of amines as cross-linking agents, such functional preferably groups as chlor or epoxy groups can be incorporated in the main chain or branch chain of grafted polymer as curing site.

In view of scorch stability, curing agents may be selected from the group illustrated in Japanese Unexamined Patent Publication No. 164,000/1979, such as amines-organic acid salts, for example, ammonium salts, hexylamine salts, hexamethylenediamine salts of benzoic acid, cuminic acid or higher fatty acids. Phenolic derivatives may also be added thereto in order to promote curing process.

It is possible to cure even at room temperature by selecting the curing agents illustrated in Japanaese Unexamined Patent Publication No. 7529/1978, such as, for example, tris (dimethylamino) phenol and catecole combination.

In case of cross-linking by nucleophilic reagents, the presence of fluorovinylidene monomer unit is preferred in the reaction mixture. The amount of the said cross-linking agent may be 0.1 to 10 phr, preferably, 0.2 to 5 phr based on the total polymer.

The well known additives or fillers generally used in the conventional curing methods can also be employed for cross-linking of the present fluorine-containing elastomers such as magnesium oxide, other fillers, pigments, antioxidants, stabilizers and so forth.

When the said additives are introduced to the present fluorine-containing elastomers, it is necessary to mix homogeneously chemical cross-linking agents, coagents and other additives. Effective mixing can be performed by using rubber roll or bumbury mixer. The condition of the above-mentioned milling may not be specified, but the effective mixing can be best performed under the condition at 30° to 80° C. for about 10 to 60 minutes.

Such additives can also be suspended in appropriate solvent, and the mixing can be performed in solvent, through wet milling in such mixing devices as a roll, ball-mill or homogenizer. Optimum mixing condition and operational method must be selected depending on the elastomers, ingredients added thereto, the purpose of the product. After mixing with the said additives, the present fluorine-containing elastomers can generally be molded into sheets, rods, tubes, angles, channels, soaked cloth and so forth through conventional molding, transfer, roll coating, painting, soaking and others. By employing various methods of molding, "irregular-shaped" products, special molded materials, such as those of sponge-like rubbers can also be prepared. These molded materials of the present elastomers can be cured by the methods hereinafter described, and then the cured rubber products are thus made from the present fluorine-containing elastomers.

In the present invention, ordinary operational processes can be applied for the said chemical cross-linking, such as, hot press molding, extrusion, calender roll, injection molding followed by heating in an air oven or a steam oven. The optimized curing condition may be selected according to the materials used and compounding formulation. The temperature is generally within the range of 80° to 250° C., preferably, 120° to 200° C. Although heating time may not be specified, it is within 1 minute to 3 hours, preferably, 5 minutes to 2 hours depending on the cross-linking agent employed. When the high curing temperature is employed, heating time can be accordingly shortened. Post-curing can be adoptible to improve further the characteristic properties of the cross-linked elastomers at 150° to 250° C., preferably, 180° to 230° C. for 2-24 hours.

On the other hand, appropriate selection of curing sites and agents enables curing at the ambient temperature. In this case, the present elastomers having epoxy functional group as curing site can be cured for example by amine-phenol type of curing combination, and curing can be completed by drying at the room temperature for 1 to 7 days. Heating can, of course, accelerate curing, and temperature may range from room temperature up to 120° C.

The present fluorine-containing elastomers have excellent thermal resistance, high chemical resistance, good oil resistance and further satisfactory low temperature properties, and the mechanical properties, such as strength, hardness and elongation are satisfactory. Thus, it is possible to use this elastomers for wide application of practical use. Unlike the existing fluoro-rubbers, the present fluorine-containing elastomers are well characterized in non-adherent, lubricating, low hardness, flexibility, and high compatibility with fillers. Owing to the internal plasticity, the compound Mooney is low, so that moldability is excellently improved.

By utilizing the aforementioned properties of the present elastomers, various sealing materials, such as steam seal, oil seal, o-ring and packing can be prepared, and also soaked cloth, anti-corrosive cloth, non-tacky, lubricating cloth, oil-proof cloth and many others. Because of the excellent compatibility with fillers, of which property the conventional fluoro rubbers fail to provide, the sealing materials for high speed rotating parts may be a most preferable application of the present fluorine-containing elastomers.

Cost reduction can be expected for the production of molded materials by using the present elastomers, this economical aspect is also attractive.

The present invention is further illustrated by the following examples. It should be understood, however, that this is done solely by way of examples and that it is intended neither to delineate the scope of the appended claims.

The average degree of polymerization is calculated by dividing a number average molecular weight of the segment measured by the osmotic pressure method by an average formula weight for the components of the segment.

EXAMPLE 1

Fifty grams of the fluorine-containing polymeric segment of average degree of polymerization being 800, whose chemical composition, the mol. ratio of $C_2F_4:C_3H_6$:glycidyl vinylether was 54:44:2, respectively, was dissolved in 500 ml of ethyl acetate at room temperature. After complete dissolution, 500 grams of polysiloxane of average degree of polymerization being 200 consisting in the following chemical composition was added thereto,

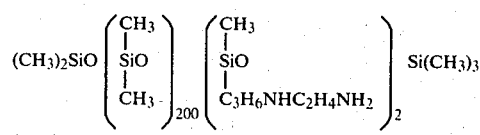

and the reaction mixture was stirred for 16 hours at room temperature, followed by refluxing at 77° C. for further 2 hours. The solvent was then removed by distillation and the reaction product was dried. The unreacted polysiloxane was extracted by 100 ml of carbon tetrachloride. The purified polymer dried in vacuum deccicator was found transparent elastomer with the decomposition temperature at 305° C. The polymer thus prepared was found to contain 23 weight % of polysiloxane and 77 weight % of the fluorine-containing polymeric segment in partially gelled form.

To 100 parts of the aforementioned polymer perpared, 1 part of α',α'-bis-(t-butylperoxy)-p-diisopropyl benzene, 2 parts of trialkyl isocyanurate and 80 parts of MT-carbon were added. Curing this mixture was first carried out at 170° C. for 20 minutes, followed by an open curing for 16 hours at 200° C. yielding a cured sheet. The physical properties of this sheet is illustrated in Table 1. It will be easily appreciated that the polymer obtained under the method specified above exhibit high thermal resistance and good oil resistance and high degree of strength and excellent compatibility with fillers.

EXAMPLE 2

Polysiloxane used in the present example had the following chemical composition and of average degree of polymerization of 3,000.

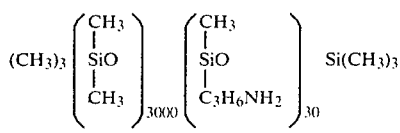

Seventy parts of the same polymeric segment containing fluorine as used in Example 1 and 30 parts of the polysiloxane were mixed and reacted in the same way as specified in Example 1. The graftpolymer thus obtained was almost insoluble in carbon tetrachloride, partially gelled, and transparent.

The aforementioned polymer was formulated and cured as specified in Example 1. The physical properties are illustrated in Table 1. It will be seen that the present method provides low hardness rubber having the excellent thermal resistance and good solvent resistance. Furthermore, low temperature properties are also seen fairly improved.

EXAMPLE 3

Seventy grams of fluorine-containing polymeric segment of low degree of polymerization, whose number average degree of polymerization being 135, and the mol. ratio of $C_2F_4:C_3H_6$:glycidyl vinylether being 55:42:3, respectively, was dissolved in 300 grams of $CF_2Cl-CFCl_2$ (hereinafter R-113) and 30 grams of polysiloxane of the following chemical formula

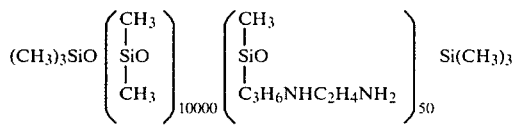

and having average degree of polymerization of about 10,000 was dissolved in 200 grams of R-113, separately. These solutions were mixed at room temperature and was gradually heated up to 47° C., the boiling temperature of R-113. After the reaction mixture was refluxed for 24 hours, R-113 was then removed by distillation. The grafted polymer which was dried at 75° C. in vacuum for 5 hours was soft, transparent, almost insoluble in carbon tetrachloride, but was soluble in tetrahydrofuran. The above-mentioned polymer was easily processed by means of the rubber mill and had excellent compatibility with fillers.

To 100 parts of the polymer prepared, 2 parts of zinc diethyl dithiocarbomate, and 1 part of catecol, 60 parts of MT-carbon, 5 parts of amorphus silica and γ-alumina powder of 2μ diameter were added for and cured in a press at 170° C. for 20 minutes followed by an oven cure at 200° C. for 4 hours. The physical properties of the cured rubber are listed in Table 1. Soft rubber of excellent thermal resistance, good low temperature properties and good oil resistance is obtained.

EXAMPLE 4

Fifty grams of fluorine-containing polymeric segment of average degree of polymerization of 100, of which chemical ratio of vinylidene fluoride:hexafluoropropylene being 70:30 respectively, was dissolved in 200 grams of methyl ethylketone. 50 grams of the same polysiloxane used in Example 3 was dissolved in another portion of 300 grams of methyl ethylketone. Both solution was mixed at room temperature, and the reaction mixture was then gradually raised up to the boiling point of methylethyl ketone and refluxed for 24 hours. After removing methylethyl ketone by distillation, the polymer was dried in vacuum at 120° C. for 5 hours, which was mostly insoluble in carbon tetrachloride, but soluble in tetrahydrofurane.

The obtained polymer was easily processed on a conventional rubber mill and can be conveniently mixed with fillers. Curing was carried out under the same condition specified in Example 3, and the physical properties are illustrated in Table 1. It will be appreciated that the vulcanizate prepared was of low hardness with excellent thermal resistance and good oil resistance.

EXAMPLE 5

Two types of the polymers consisting of the same molar ratio of $C_2F_4:C_3H_6$:glycidylvinyl ether of 56:42:2, respectively, were prepared, one of them had the average degree of polymerization of 800, and the other 2,700. Fifteen grams each of the polymers prepared was dissolved in 500 grams of R-113. Thirty three grams of polysiloxane of the following formula

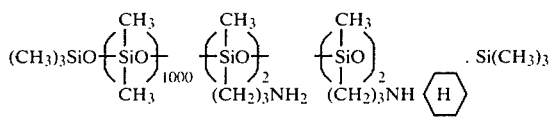

was dissolved in 15 grams of R-113, which was gradually added into the above described solution containing the fluoropolymers. The mixture was stirred for three hours at room temperature, followed by elevating the temperature up to 50° C. to evaporate R-113 during the next 1.5 hours. The reaction mixture was further condensed at 80° C. for 3 hours under vacuum, yielding transparent soft and homogeneous elastomer which was soluble in tetrahydrofuran.

To 100 parts of the polymer obtained was mixed 1.45 parts of hexamethylenediamine cuminate, stearic acid and 80 parts of MT-carbon. The compound has the Mooney scorch time (the time required to increase 5 points of Mooney index) of 10 minutes at 125° C., the compound Mooney 95. The measurement by curastometer recorded the minimum torque of 0.80, the maximum torque of 1.65, and it took 23 minutes until 90% of curing was completed. The remolding of the cured compound after press cure at 170° C. for 20 minutes was found quite easy. The molded sheet after curing in a press showed 112% elongation at 170° C., indicating that this polymer is suitable for molding of the complex-shaped article. It is possible to improve the mechanical properties by post curing of the sample polymer at 200° C. for 4 hours after the press-cure, resulting in the vulcanizate of the tensile strength of 95 kg/cm², elongation 238%, 100% modulus of 82, hardness of 80, compression set of 58% (200° C.×22 h). The oil resistance test by using ASTM #1 and #3 oil at 150° C. showed the volume change of 1.5% and 14.1%, respectively. Furthermore, the volume changes of the vulcanizate after immersed in 96% sulfuric acid, 60% nitric acid, 50% sodium hydroxide solution and hot water, at 100° C. for 3 days were 17.6%, 31.5%, 0.2%, and 0.8%, respectively. Furthermore, when exposed to steam at 200° C. (17 kg/cm²) for 3 days, the volume change was observed 6.4% without any change in appearance.

EXAMPLE 6

Fifty grams of polysiloxane latex (EP-40L, Shinetsu Kagaku K.K.) composing of a copolymer of dimethylsiloxane and methyl vinyl siloxane, 0.25 g of ammonium persulphate, 0.07 g of sodium bisulfite, 1.0 g of disodium phosphate 12 hydrate, 0.25 g of ammonium perfluorocarboxylate, 0.08 g of glycidylvinyl ether were charged into a 100 ml autoclave, which was then degassed and the mixed gas of tetrafluoroethylene and propylene (mol. ratio 85:15) was introduced under the pressure of 23 kg/cm² at room temperature. The polymerization reaction was initiated at 50° C. After 5 hours, the temperature was lowered to terminate the reaction. The latex thus obtained was freeze-coagulated, giving 20 grams of a lightly gelled soft rubber. The elementary analysis showed that the fluorine content was 10%. To 100 parts of the above-mentioned polymer, 2 parts of benzoic acid-hexylamine salt, 2 parts of catecole, 35 parts of MT-carbon were mixed on an open roll, and then cured in a press at 170° C. for 30 minutes, and further oven-cured at 200° C. for 2 hours. The sheet obtained showed tensile strength of 48 kg/cm², elongation of 600%, volume changed of 20% after immersed in ASTM #3 oil at 150° C. for 3 days.

COMPARATIVE EXAMPLE 1

The same fluorine-containing polymer used in Example 1 was mixed with 1 part of Nocceler PZ® (zinc diethyldithiocarbamate) 2 parts of catecole, and 80 parts of MT-carbon, and the mixture was cured in mold. The press cured samples were mostly broken on remolding. Peroxide cure was also tried as specified in Example 1, but provided the vulcanizate of high hardness of 92 in low yield.

COMPARATIVE EXAMPLE 2

A commercially available silicone rubber was cured using benzoylperoxide to give the silicone rubber of low hardness with high thermal resistance and satisfactory low temperature properties, however, oil resistance was not satisfactory.

COMPARATIVE EXAMPLE 3

Seventy grams of the copolymer (degree of polymerization 800) comprising $C_2F_4$ and $C_3H_6$ with the molar ratio of $C_2F_4/C_3H_6 = 54:46$, and polydimethyl siloxane (degree of polymerization 200) were mixed on a roll, but the band formation was very poor and the blending was too difficult. After elaborate mixing of prolonged time, the mixture was subjected to the compounding and curing as specified in Example 1. About 50% of press-cured samples was broken on remolding. The vulcanizate lacked the strength and elongation with high hardness and low oil resistance.

COMPARATIVE EXAMPLE 4

Fluorine-containing polymer used in Example 5 was compounded and cured in the same way as specified in Example 5. The Mooney scorch time of the compound was 10 minutes at 125° C., compound Mooney 195, minimum torque 1.20, maximum torque 20, and it took 15 minutes until 95% of curing was completed. The compound was press-cured at 170° C. for 20 minutes, but the remolding was difficult. After oven-cure, the vulcanizate showed the tensile strength of 140 kg./cm², elongation of 227%, 100% modulus of 98, hardness of 90, compression set of 63% (220° C.×22 h), volume changes in ASTM #1 and #3 oils after immersion for 3 days at 150° C. of 1.0 and 13.1%, respectively.

TABLE 1

|  | Example 1 | Example 2 | Example 3 | Example 4 | Comparative Example 1 | Comparative Example 2 | Comparative Example 3 |
|---|---|---|---|---|---|---|---|
| Roll processability | good | good | excellent | excellent | good | good | fair |
| moldability | good | good | excellent | excellent | good | excellent | fair |
| cured material Physical properties (normal condition) of vulcanizate |  |  |  |  |  |  |  |
| $T_B$ Kg/cm²[a] | 138 | 40 | 80 | 75 | 145 | 45 | 47 |
| $E_B$ %[b] | 230 | 280 | 320 | 400 | 170 | 240 | 73 |
| $H_B$ JIBA | 78 | 58 | 50 | 58 | 92 | 37 | 88 |
| Oil resistance $\Delta V$[c] |  |  |  |  |  |  |  |
| ASTM# 3, 150° C. × 3d | 13 | 13 | 14 | 9 | 10 | 45 | 18 |
| Low temperature property °C. (Clashberg test 10³ Kg/cm²) | +10 | −15 | −35 | −45 | +15 | −60 | −5 |
| Thermal aging resistance property change after 230° C. × 10 days aging |  |  |  |  |  |  |  |
| $\Delta T_B$ (%) | +31 | +214 | +45 | +60 | +15 | −21 | +165 |
| $\Delta E_B$ (%) | −46 | −61 | −55 | −62 | −45 | −8 | −25 |

[a]tensile strength,
[b]ultimate elongation,
[c]volume change in %

What is claimed is:

1. Fluorine-containing elastomers comprising a grafted copolymer having rubber-like elasticity and having chemical linkages at the reactive sites of fluorine-containing polymeric segments and organopolysiloxane segments, wherein the fluorine-containing polymeric segments consist of two or more chemically different monomeric units at least one of which being a fluorine-containing olefinic unit, said siloxane segments containing amino groups reactive sites.

2. Fluorine-containing elastomers according to claim 1 wherein a number average degree of polymerization of fluorine-containing polymeric segments range from 50 to 10,000.

3. Fluorine-containing elastomers according to claim 1 wherein the average degree of polymerization of organopolysiloxane segments range from 50 to 50,000.

4. Fluorine-containing elastomers according to claim 1 wherein fluorine-containing polymeric segments comprise the copolymer of tetrafluoroethylene and propylene.

5. Fluorine-containing elastomers according to claim 1 wherein Fluorine-containing polymeric segments comprise the copolymer of vinylidene fluoride and hexafluoropropylene.

6. Fluorine-containing elastomers according to claim 1 wherein Fluorine-containing polymeric segments comprise the copolymer of tetrafluoroethylene and perfluoroalkyl perfluorovinylether.

7. Fluorine-containing elastomers according to any of claim 1 or claim 3 wherein organopolysiloxane segments consist of the polymer of dimethyl siloxane.

8. Fluorine-containing elastomers according to claim 1 wherein 100 parts by weight of fluorine-containing polymeric segments are chemically grafted to 1 to 2000 parts by weight of organopolysiloxane segments.

9. Fluorine-containing elastomers according to claim 1 or claim 4 wherein fluorine-containing polymeric segments comprise the copolymer of tetrafluoroethylene and propylene, and glycidyl vinylether as reactive sites, and that organopolysiloxane is selected from the group consisting of either polymer of dimethyl siloxane or polymers of trifluoropropyl siloxane containing amino groups as reactive sites.

10. Fluorine-containing elastomers according to claim 9 wherein a side chain containing amino group in organopolysiloxane is selected from the group consisting of aminopropyl, N-aminoethylaminopropyl, N-cylohexylaminopropyl.

11. Fluorine-containing elastomers according to claim 1 or claim 3 wherein organopolysiloxane is the polymer of methyl trifluorpropylsiloxane.

12. Fluorine-containing elastomer according to claim 1 wherein both of fluorine-containing polymeric segments and organopolysiolxane segments contains reactive sites, and then the graft copolymer is obtained by the chemical reaction of the reactive sites.

13. Fluorine-containing elastomers comprising a grafted copolymer having rubber-like elasticity and having chemical linkages at the reactive sites of fluorine-containing polymeric segments and organopolysiloxane segments, wherein the fluorine-containing polymeric segments consist of two or more chemically different monomeric units at least one of which being a fluorine-containing olefinic unit, said fluorine-containing polymeric segments containing epoxy, carboxyl or chloroethyl groups reactive sites and said siloxane segments containing amino or carboxyl groups reactive sites, with the proviso that the two chosen groups are coreactive.

14. Fluorine-containing elastomers comprising a grafted copolymer having rubber-like elasticity and having chemical linkages of fluorine-containing polymeric segments and organopolysiloxane segments at reactive sites of said segments, wherein the fluorine-containing polymeric segments consist of two or more different units at least one of which being a fluorine-contaning olefinic unit, said fluorine-containing polymeric segments containing carboxyl or amino groups reactive sites and said siloxane segments containing epoxy groups reactive sites.

* * * * *